(12) United States Patent
Schnee et al.

(10) Patent No.: US 12,091,123 B2
(45) Date of Patent: Sep. 17, 2024

(54) METHOD AND DEVICE FOR CLASSIFYING AN ACCIDENT EVENT INVOLVING A TWO-WHEELED VEHICLE

(71) Applicant: Robert Bosch GmbH, Stuttgart (DE)

(72) Inventors: Jan Schnee, Weil im Schoenbuch (DE); Juergen Stegmaier, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/789,991

(22) PCT Filed: Jan. 19, 2021

(86) PCT No.: PCT/EP2021/051027
§ 371 (c)(1),
(2) Date: Jun. 29, 2022

(87) PCT Pub. No.: WO2021/151722
PCT Pub. Date: Aug. 5, 2021

(65) Prior Publication Data
US 2023/0057497 A1    Feb. 23, 2023

(30) Foreign Application Priority Data
Jan. 31, 2020   (DE) ..................... 10 2020 201 224.5

(51) Int. Cl.
*G05D 1/00*       (2024.01)
*B60R 21/0132*    (2006.01)
(Continued)

(52) U.S. Cl.
CPC ....... *B62J 45/4151* (2020.02); *B60R 21/0133* (2014.12); *B62J 27/00* (2013.01);
(Continued)

(58) Field of Classification Search
CPC ...... B62J 45/4151; B62J 50/20; B62J 45/414; B62J 45/4152; B62J 27/00;
(Continued)

(56) References Cited

U.S. PATENT DOCUMENTS 10,773,598 B1 *   9/2020  Yamasaki ............. G01S 13/931
2002/0039951 A1    4/2002  Hasegawa
(Continued)

FOREIGN PATENT DOCUMENTS

DE          60209971 T2     8/2006
DE       102008003767 A1   10/2008
(Continued)

OTHER PUBLICATIONS

International Search Report for PCT/EP2021/051027, Issued Apr. 9, 2021.

*Primary Examiner* — Adam M Alharbi
(74) *Attorney, Agent, or Firm* — NORTON ROSE FULBRIGHT US LLP; Gerard A. Messina

(57) ABSTRACT

A method for classifying an accident event of a two-wheeled vehicle, in particular a bicycle. The method can be run in the form of an algorithm in a device comprising an analysis unit in order to indicate to the rider or a third party that the two-wheeled vehicle has been involved in a collision or has fallen over using a corresponding generated and/or transmitted item of information. The device can be used in a two-wheeled vehicle, such as a bicycle or in particular in an electric bicycle. However, it can of course also be used in a motorcycle or another single-track vehicle.

12 Claims, 2 Drawing Sheets

(51) Int. Cl.
    *B62J 27/00*       (2020.01)
    *B62J 45/414*     (2020.01)
    *B62J 45/415*     (2020.01)
    *B62J 50/20*       (2020.01)
    *B62M 6/50*        (2010.01)
    *B60R 21/00*      (2006.01)

(52) U.S. Cl.
    CPC ......... *B62J 45/414* (2020.02); *B62J 45/4152* (2020.02); *B62J 50/20* (2020.02); *B62M 6/50* (2013.01); *B60R 2021/0088* (2013.01)

(58) Field of Classification Search
    CPC ........ B60R 21/0133; B60R 2021/0088; B62M 6/50; G05D 1/0016; B64C 39/024; G05G 9/02; G05G 9/047; G05G 1/08; G06F 3/0338; H04N 5/23203; H04N 5/23245; H04N 5/2352; H04N 7/185; H04N 23/66; H04N 23/72; H04N 23/667; H04N 23/73; H04N 23/75
See application file for complete search history.

(56) References Cited

U.S. PATENT DOCUMENTS

2003/0132837 A1*  7/2003  Hasegawa ................ G01C 9/06
                                                              340/440
2008/0238056 A1* 10/2008  Kobayashi .......... B60R 21/0132
                                                               280/735
2018/0222473 A1*  8/2018  Shami ................... B60W 50/14

FOREIGN PATENT DOCUMENTS

| | | |
|---|---|---|
| DE | 102012203640 A1 | 9/2013 |
| DE | 102018100191 A1 | 7/2018 |
| EP | 2632772 A1 | 9/2013 |
| EP | 3508405 A1 | 7/2019 |
| WO | 2012056423 A1 | 5/2012 |

* cited by examiner

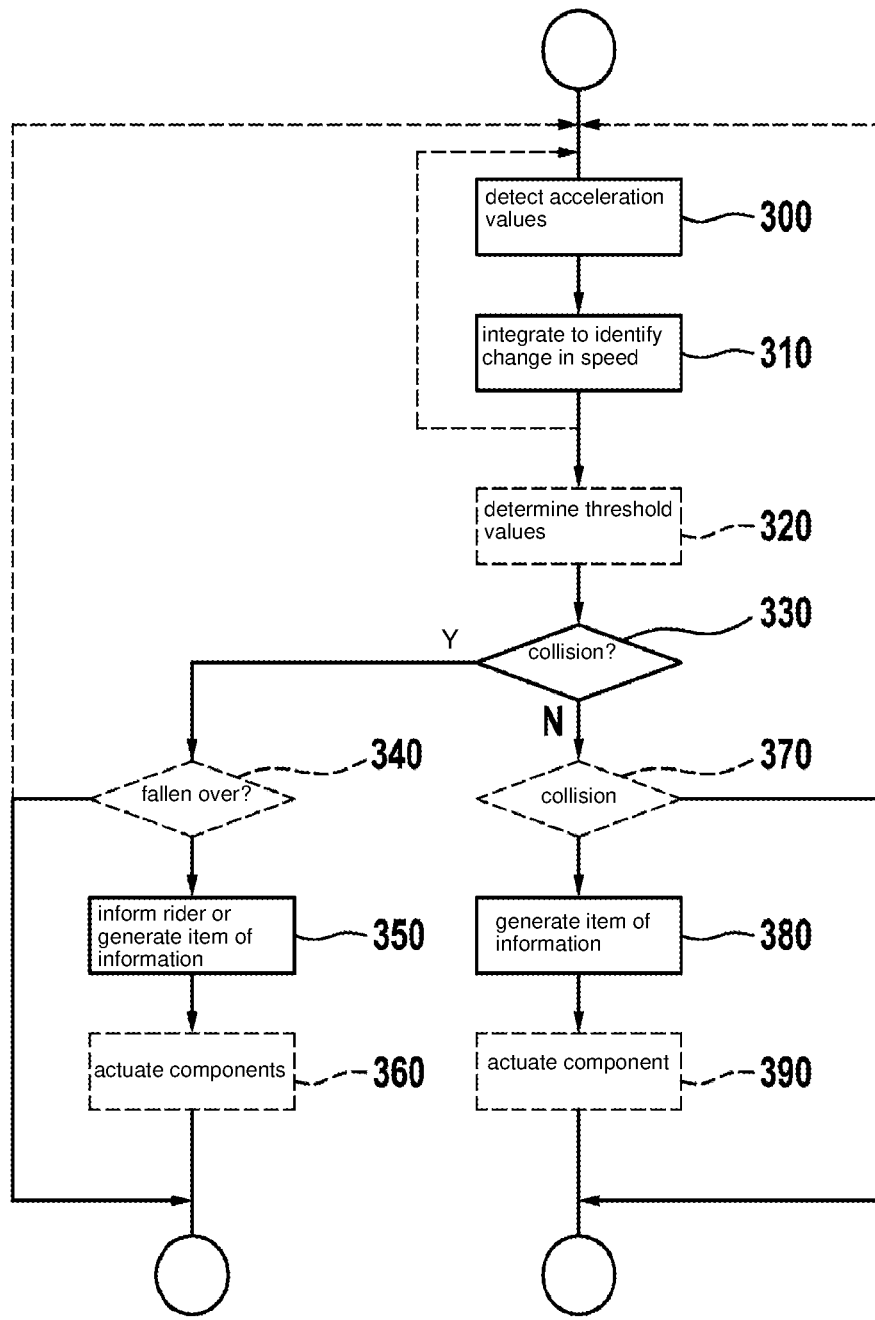

METHOD AND DEVICE FOR CLASSIFYING AN ACCIDENT EVENT INVOLVING A TWO-WHEELED VEHICLE

FIELD

The present invention relates to a method and to a device for classifying or performing a plausibility check on an accident event involving a two-wheeled vehicle, in particular an accident involving an electric bicycle.

BACKGROUND INFORMATION

A series of sensors fastened to a two-wheeled vehicle, for example a bicycle and in particular an electric bicycle, can be used to monitor both the operation of the two-wheeled vehicle and the riding situation. For instance, speed sensors can detect the wheel speed and the two-wheeled vehicle speed can be derived therefrom. Furthermore, inclination sensors, or acceleration sensors or angular rate sensors, can detect the tilting or inclination on the roadway, and sensors on the crank of a bicycle can detect the riding activity.

Critical situations or even accidents can be identified from the analysis of these detected sensor variables, for example by monitoring the behavior of these sensor variables over time. These identified critical situations or accidents can be used to automatically request assistance or at least relay an item of information to third parties.

An object of the present invention is to classify an accident such that an accident event in the form of a critical situation can be distinguished from the bicycle falling over without there having been a direct collision.

SUMMARY

The present invention relates to a method for classifying an accident event of a two-wheeled vehicle, in particular a bicycle. In this case, the method according to an example embodiment of the present invention can be run in the form of an algorithm in a device comprising an analysis unit in order to indicate to the rider or a third party that the two-wheeled vehicle has been involved in a collision or has fallen over using a corresponding generated and/or transmitted item of information. The device can be used in a two-wheeled vehicle, such as a bicycle or in particular in an electric bicycle. However, it can of course also be used in a motorcycle or another single-track vehicle.

In accordance with an example embodiment of the present invention, to classify an accident event of the two-wheeled vehicle or a corresponding single-track vehicle, the acceleration of the two-wheeled vehicle in the movement plane of the two-wheeled vehicle is detected. Optionally, however, the movement in the direction of the vertical plane can also be detected in addition. By way of example, to detect the acceleration in the movement plane, two acceleration directions which are orthogonal to one another can be detected. This acceleration can be detected permanently, meaning that new sensor variables are always available, or can be detected in a time-controlled manner in a predefinable time frame or at predetermined points in time. Optionally, the detection can also be controlled on the basis of predetermined or specially identified operating situations instead. A first integration variable is then formed or generated on the basis of the temporal integration of a first sensor variable, which for example represents the acceleration in the longitudinal direction or travel direction of the two-wheeled vehicle. Accordingly, a second integration variable is formed or generated on the basis of a second sensor variable, which for example represents the acceleration in the transverse direction to the longitudinal direction or travel direction of the two-wheeled vehicle. The core feature of the present invention involves classifying an accident, which for example has been identified by another method, as to whether it is a serious accident or just the two-wheeled vehicle falling over, which is comparatively unproblematic, without the rider of the two-wheeled vehicle being expected to be injured. For this purpose, a serious accident is classified and thus identified on the basis of the first and the second integration variable.

The classification can be carried out by comparing the first and/or the second integration variable with at least one shared threshold value or a separately assigned threshold value in each case. Alternatively or additionally, the result of the classification can also be made dependent on a direct comparison of the two integration variables.

Here, the method according to an example embodiment of the present invention can identify a collision and thus an accident involving a suspected injury when the first integration variable, which for example represents the acceleration in the longitudinal direction of the two-wheeled vehicle, or the magnitude thereof exceeds a first threshold value. Optionally or additionally, a collision can also be identified if the first integration variable or its magnitude is greater than the second integration variable, in particular by a multiple. In this case, it could, for example, be indicated that the (negative) acceleration or even the braking in the longitudinal direction is abrupt and considerably greater than the extent to which the two-wheeled vehicle has toppled over sideways. If a collision is identified in this process, the method can generate an item of information that is relayed to the rider or to an external location in order to call for assistance.

The method according to an example embodiment of the present invention can, however, also identify an accident situation in which no injuries are expected, for example in the event that the two-wheeled vehicle has just toppled over sideways. For this purpose, during the classification, the method checks whether the second integration variable or its magnitude exceeds a second threshold value. Optionally or additionally, for this purpose, the method can check whether the second integration variable is greater than the first integration variable, in particular by a multiple. This kind of behavior would imply that the two-wheeled vehicle has toppled over sideways and is substantially not moving forward or being braked in the longitudinal direction.

Optionally, the method can also detect the roll angle and pitch angle of the two-wheeled vehicle or the change in these angles over time in the sense of an angular rate. A classification of the movement of the two-wheeled vehicle can likewise be derived from the roll angles and pitch angles, detected in this manner, or the associated angular rates.

In a development of the present invention, a mass-specific energy variable, which can likewise be used for the classification, is derived from the first and second integration variables. For this purpose, a shared tilt variable is additionally derived from the roll angle and the pitch angle and also incorporated in the classification. To identify a collision in this case, a check is carried out to determine the extent to which the energy variable exceeds an energy threshold value and the tilt variable exceeds a tilt threshold value. If the energy threshold value is exceeded first and then the tilt threshold values are exceeded, the method generates an item of information which states that a collision has occurred involving a suspected injury. If, however, the energy value and the tilt variable both remain below the corresponding threshold values, the method generates an item of information which merely represents the two-wheeled vehicle in particular having fallen over sideways, or even a bicycle that is still upright. A further tilt threshold value can be used to make a distinction from a side-on collision. Typical variables for an upright bicycle are in the range of the tilt variable of 0-45°.

Optionally, on the basis of an energy value which is above a corresponding threshold value and a tilt variable which is below a corresponding threshold value, the method can generate an item of information which represents a collision of the two-wheeled vehicle.

Optionally, the energy threshold value can be modulated to identify a collision on the basis of the tilt variable, roll angle, and/or pitch angle, in particular the absolute values thereof. Here, the energy threshold value can be selected to be low at low values of the tilt variable, roll angle, and/or pitch angle and can increase slowly initially and then exponentially or quadratically, for example, as the values of the tilt variable, roll angle, and/or pitch angle increase. In this case, a collision is identified if this energy threshold value is exceeded. Alternatively, an impact can be identified using an energy threshold value which is set to be high at low values of the tilt variable, roll angle, and/or pitch angle and drops slowly initially and then likewise exponentially or quadratically as the values of the tilt variable, roll angle, and/or pitch angle increase.

Further advantages will become clear from the following description of exemplary embodiments and from the figures.

BRIEF DESCRIPTION OF THE DRAWINGS

FIG. 3 show a flowchart which describes a possible exemplary embodiment of the method according to the present invention.

DETAILED DESCRIPTION OF EXAMPLE EMBODIMENTS

To describe the present invention, a two-wheeled vehicle in the form of a bicycle 10 is taken as a starting point, but other single-track vehicles such as electric bicycles, motorcycles, e-scooters, scooters, or even automobiles could be equipped with this invention. In the present case of the bicycle 10, a smartphone 20 is provided as a mobile terminal, which is attached to the handlebars of the bicycle 10 and is configured for detecting and processing sensor data. Here, the smartphone 20 is used, for example, as a navigation instrument, as an indicator of riding dynamics parameters, and/or for controlling the drive of the bicycle 10. To carry out the method according to the present invention, the smartphone 20 uses the sensor variables provided by the sensors available in the smartphone 20. Alternatively or optionally additionally, the smartphone 20 can access sensors attached to the bicycle 10. Acceleration sensors on one of the wheels and/or the frame, as well as angular sensors and angular rate sensors, would be possible here, for example. The bicycle usually moves forward on the roadway substantially in the movement plane xy in the longitudinal direction x. Owing to the vehicle turning off and traveling around bends, the movement plane xy is spanned by an additional lateral transverse direction y. There is movement in the direction of the vertical axis z when going uphill or downhill, for example. Further movements which can take effect in the direction of the vertical axis are generated by rotations in the direction of the x axis or by bumps in roadways. All of these movements in the direction of the z axis can be distinguished from one another by characteristic orders of magnitude of the speed of change, i.e., the dz/dt. Therefore, for example, traveling uphill or downhill is associated with a longer time constant than the bicycle toppling over sideways substantially along the x axis. Bumps in the roadway, on the other hand, are characterized by very slight movements in the z direction within a short time.

The sensors in the smartphone 20 are aligned with their own coordinate system. Attaching the smartphone to the handlebars therefore makes it necessary to recalibrate these sensors in terms of alignment with the coordinate system determined by the movement. The spatially resolved sensor variables from the angular rate sensor or acceleration sensor can thus be used in the smartphone to detect this defined coordinate system during normal riding activity. One option for carrying out this calibration to align the sensor variables with the movement plane xy of the bicycle is the Euler angle estimation method, for example.

Figure 1:
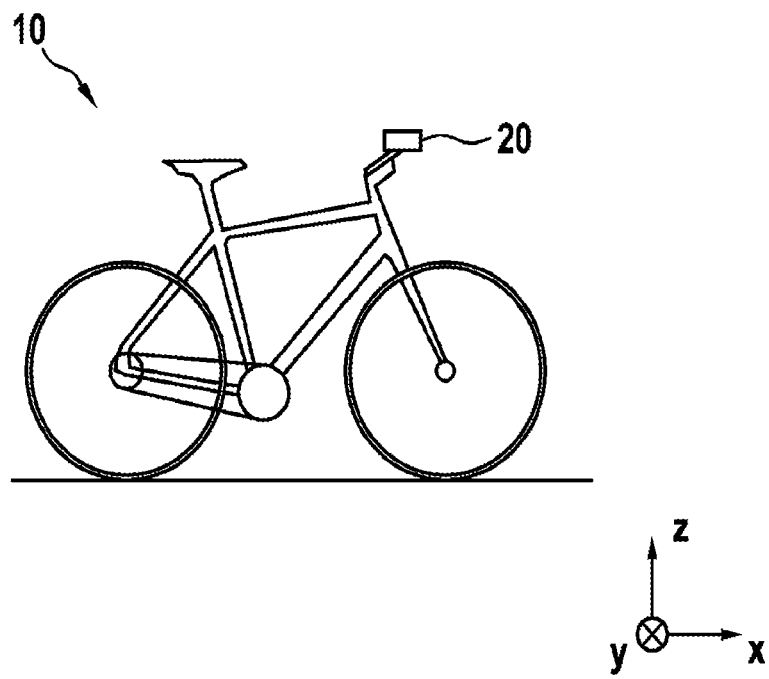
FIG. 1 schematically shows a two-wheeled vehicle comprising a mobile terminal and a coordinate system in which the two-wheeled vehicle moves during normal riding activity.
Figure 2:
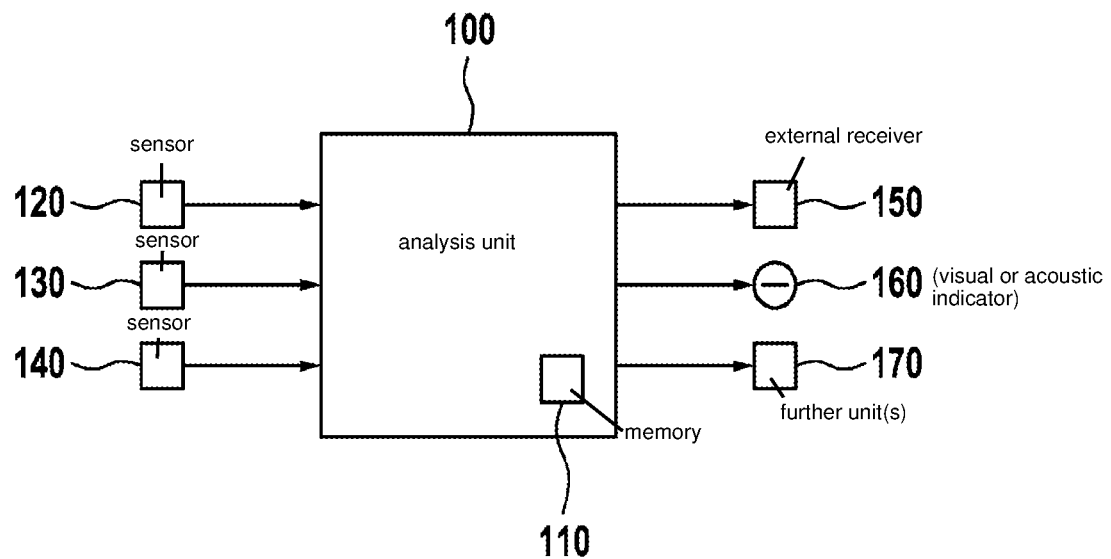
FIG. 2 shows a possible example implementation of a device according to the present invention.

FIG. 2 schematically shows a device according to the present invention which performs the method according to the present invention. In this case, the device can comprise an analysis unit 100 having a memory 110, while the sensors 120, 130, and 140 are configured to be separate, such that the corresponding sensor variables can be input by the analysis unit 100. Optionally, however, the device can also comprise one or more sensors in addition to the analysis unit 100 and the memory 110, and can therefore itself detect at least some of the sensor variables required for the method according to the present invention. In this case, reference is made, for example, to a smartphone 20 as mentioned at the outset as the device according to the present invention, which smartphone already comprises acceleration sensors 120, angular sensors 130, and/or angular rate sensors 140. Both the detected sensor variables and the derived variables, for example the integration variables, or the energy variable and the tilt variable, can be stored in the assigned memory 110. Furthermore, the corresponding threshold values can be stored in the memory 110.

Using at least a first sensor 120, the analysis unit 100 detects an acceleration variable representing the movement of the two-wheeled vehicle. Here, it is particularly advantageous for the first sensor 120 to detect the acceleration in at least two directions x and y of the movement plane in the form of first and second sensor variables, respectively. Alternatively, separate acceleration sensors can also detect corresponding first and second sensor variables for the two movement directions, respectively.

In further exemplary embodiments, further sensors can be provided which make it possible to classify the accident event or which perform a plausibility check on the classification. By way of example, an angular sensor 130 which detects sensor variables for the roll angle and pitch angle of the two-wheeled vehicle can be provided for this purpose. As an alternative, two angular sensors which detect sensor variables for the roll angle and pitch angle independently of one another can be provided in this case, too. In addition or alternatively to the angular sensor 130, the analysis unit 100 can also detect the sensor variables from an angular rate sensor 140. In this case, a first angular rate $\omega_x$ about the longitudinal axis x or the travel direction of the two-wheeled vehicle and a second angular rate $\omega_y$ about the y direction transversely to the longitudinal axis x are of particular importance for the classification of the accident event. As already provided in the acceleration sensor 120 or the angular sensor 130, it can also be provided in the angular rate sensor 140 that separate angular rate sensors 140x detect the first and the second angular rate $\omega_x$ and $\omega_y$, respectively.

If the method identifies that the accident event is associated with a collision or involves an injury, the analysis unit 100 generates an item of information to indicate this situation. For this purpose, in the simplest case, the rider is informed via a corresponding visual or acoustic indicator 160. However, it is also possible for this information to be sent to an external receiver 150 in order to call for assistance. This can be a control center, a preselected contact, or, in general, the emergency services. Optionally, further units 170 in the device 100 or on the two-wheeled vehicle can be actuated if a collision is identified. For example, the drive unit can be switched off, an energy source can be disconnected, or a prepared distress signal can be sent.

Similar information can also be output if the method merely identifies that the vehicle has fallen over without anyone being harmed. For instance, the information about the severity of the vehicle falling over can be relayed in order to provide the emergency services with assistance in advance. The degree of intervention in the components and apparatuses 170 of the two-wheeled vehicle can also be controlled in this way.

A possible sequence of the method according to the present invention will be described in the following on the basis of the flow diagram in FIG. 3. Using this method or the associated algorithm, an in particular head-on or side-on collision of the two-wheeled vehicle with another vehicle, a person, an animal, or an object, can be distinguished from the vehicle falling over sideways, in particular. As a result, both the severity of the accident can be classified and the sequence or course of events of the accident can be evaluated. Both the classification and the evaluation of the sequence of events of the accident can be used to initiate assistance measures either directly or by using further processes.

Following the start of the method, in a first step 300 at least acceleration variables $a_x$ and $a_y$ are detected, which represent the acceleration of the two-wheeled vehicle in the x and y directions. These two directions are substantially the movement direction or longitudinal direction x of the two-wheeled vehicle and a y direction orthogonal to this x direction in the typical movement plane of the two-wheeled vehicle. The acceleration sensor required for this purpose can be securely mounted on the two-wheeled vehicle or can be part of an indicator and control device that a rider can fasten to the bicycle temporarily or carries with them for detecting the movement during travel. To detect these and other sensor variables, it is possible, for example, to use the sensors in a mobile terminal, such as a smartphone, or a human machine interface (HMI) which is used, for example, to control the drive of an electric vehicle.

Optionally, in step 300, additional sensor variables can be detected which can be used for further exemplary embodiments. For example, angular rate sensor variables $\omega_x$ and $\omega_y$ can be detected, which represent the angular rate about the x direction and y direction, respectively, and can thus detect the two-wheeled vehicle tilting (sideways) or the two-wheeled vehicle overturning forward over the handlebars. Additionally or alternatively, the roll angle $\varphi$ and/or pitch angle $\theta$ can be detected using a suitable sensor. Instead of detecting the roll angle and pitch angle separately, they can also be derived from the corresponding angular rate sensor variables.

The sensor variables required for the method can optionally also be detected in a separate process, meaning that up-to-date sensor variables are always available to the method according to the present invention.

If the sensor variables, such as the acceleration sensor variables, are detected by a removable mobile terminal, it may be necessary to calibrate the alignment of the sensor variables, since the spatial directions defined in the mobile terminal do not correspond to the movement direction owing to the attachment and alignment when said terminal is fastened. For this purpose, calibration using Euler angle estimation is proposed, for example. Optionally, the gravitational acceleration component can also be compensated for in the detected acceleration variables.

In the next step 310, the detected acceleration sensor variables are accordingly integrated in accordance with $$\Delta v_x = \int a_x dt$$

$$\Delta v_y = \int a_y dt$$

in order to identify the change in speed in both the x direction and the y direction. In this case, to identify a collision, it is sufficient to consider the two spatial directions in which the movement of the two-wheeled vehicle is mainly envisaged. The movement in the direction of the z axis substantially relates to events which are caused by bumps in the ground or by going uphill or downhill. The integration limits are advantageously selected on the basis of the time at which the sensor variables are recorded. At a sampling rate of 100 Hz, it might thus be sufficient to integrate 5 to 10 sensor variables in each case, meaning that an integration time of 50 to 100 ms can be provided. A duration such as this is also sufficient for distinguishing a collision from the vehicle falling over (sideways) ("ground hit").

In step 330, on the basis of the change in speed $\Delta vx$ and $\Delta vy$, respectively, the spatial direction in which the main change to the speed has occurred is then identified. If it is identified that the change in speed has taken place substantially in the y direction, that the change in speed $\Delta vy$ in the y direction has exceeded a threshold value $SW_y$, or that the change is predominantly in the y direction, in particular by a multiple, it is identified that the two-wheeled vehicle has toppled over (sideways), meaning that, in step 350, the rider can be informed or, in general, an item of information can be generated to the effect that the two-wheeled vehicle has fallen over.

Optionally, by selecting the corresponding threshold values of $SW_x$ and $SW_y$, a distinction could be made as to whether a head-on (or rear-on) collision or a side-on collision has taken place. If there is a very high value for $\Delta vy$, a side-on collision could thus be identified, since a greater change in speed is to be expected in a side-on collision than if the two-wheeled vehicle falls over sideways. If, however, the system identifies that the change in speed $\Delta vy$ is very low, for example by comparing it with a further, lower threshold value $SW_y$, it can be identified that the vehicle has neither been involved in a collision nor hit the ground.

If it is identified in step 330 that a head-on or side-on collision has taken place, for example by a greater change in speed $\Delta vx$ having been detected in the x direction than in the y direction, the method identifies a collision (in the longitudinal direction or from the side). In this case, it can additionally be provided that a corresponding threshold value $SW_x$ is exceeded, as another way to check the plausibility of the collision. In the process, various threshold values $SW_{x,n}$ can also be used in order to allow the severity of the collision to be classified.

Following the identified collision in step 330, in a further step 380 an item of information relating to the collision can be generated, which is relayed to third parties, for example. A mobile terminal carried with the rider can thus be used to call for assistance or also just to inform a predefined person, using wireless technology. As a result of the severity of the collision being classified, it is also possible to relay further information that makes it easier to provide care to the rider involved in the collision. The mobile terminal used can also be the same device as the one that has also detected the required sensor variables.

Once the accident or a collision has been identified, the method can be terminated or it can be run again beginning with step 300.

In a further exemplary embodiment, once a collision of the two-wheeled vehicle has been identified, in an optional step 390 at least one component of the two-wheeled vehicle can be actuated in order to prevent any further injury to the rider and/or damage to the two-wheeled vehicle. In this regard, the drive of an electric bicycle can be switched off, for example. It is, however, also possible for a visual and/or acoustic warning apparatus to be actuated in order to inform other road users and/or call for assistance. Accordingly, if it is identified that the two-wheeled vehicle has fallen over, in an optional step 360 components of the two-wheeled vehicle can also be actuated in a similar manner. In this regard, the rider could, for example, be notified that the two-wheeled vehicle has toppled over if they have parked it and are not near it.

As already stated at the outset, there is the option of detecting further sensor variables in order to check the plausibility of a collision having been identified and/or improve the distinction from the two-wheeled vehicle having simply fallen over. In step 310, in accordance with $$\gamma = \sqrt{\theta^2 + \varphi^2},$$

a tilt variable $\gamma$ representing the orientation of the two-wheeled vehicle can thus be derived from the detected roll angle $\varphi$ and pitch angle $\theta$. In accordance with $$E_{kin,xy} = \Delta v_x^2 + \Delta v_y^2$$

this tilt variable $\gamma$ can, together with an estimated energy variable $E_{kin}$, be used in step 330 on the basis of the change in speed $\Delta vx$ and $\Delta vy$ to check the plausibility of a collision having been identified with the aid of the tilt variable $\gamma$. In this case, when there is a high tilt variable $\gamma$ (comparison with a tilt threshold value $SW_K$) and a subsequent high energy variable $E_{kin}$ (comparison with an energy threshold value $SW_E$), it is assumed that the two-wheeled vehicle has been involved in a collision. By contrast, it is identified that the two-wheeled vehicle has fallen or toppled over, in particular fallen over sideways, if the tilt variable $\gamma$ is below the tilt threshold value $SW_K$ and the energy variable $E_{kin}$ is below the energy threshold value $SW_E$. The case in which the corresponding value exceeds a threshold value and the other value does not exceed the corresponding threshold value would have to be checked for plausibility using further sensor variables in order to identify whether the two-wheeled vehicle has been involved in a collision or has fallen over. These and other plausibility checks could likewise be carried out in step 330.

Alternatively, in step 330 a side-on collision can also be identified. For this purpose, it is first identified that the vehicle has fallen over or toppled over (sideways) by way of a high roll angle $\varphi$, e.g., by a comparison with a threshold value $SW_\varphi$, optionally in connection with an increased change in speed in the y direction. If, however, a low roll angle $\varphi$ is identified together with high kinetic energy $E_{kin,y}$ in the y direction (for example by a comparison with a threshold value $SW_{Ekin,y}$), a side-on collision is identified rather than the vehicle having simply fallen over sideways.

Another configuration in step 330 can involve there having to be a temporal relationship between the individual detected angles or one or more threshold values being exceeded in order to identify that the two-wheeled vehicle has been involved in a head-on or side-on collision or has fallen over. A head-on collision can thus be identified if a pronounced pitch angle is first identified and a roll angle is then identified in a short period of time thereafter. This would indicate that the two-wheeled vehicle has driven into an obstacle and the rider and the two-wheeled vehicle have then toppled over sideways. Accordingly, the time lags in the longitudinal direction x and transverse direction y in succession can also indicate a head-on collision.

In addition, following the identification in step 330, plausibility checks can optionally also be carried out in each case to verify the identification in step 330. In the process, the identification that the vehicle has fallen over can be checked in a separate, subsequent step 340, and the identification of a collision can be checked in a step 370. For this purpose, further sensor variables or their change over time can be used. For example, within a short time after a collision is identified, it could be identified whether the two-wheeled vehicle is still moving in the longitudinal direction at an explicable speed in order to characterize a collision as unlikely. In this case, the method could be terminated or run again from step 300. In a similar manner, the fact that the two-wheeled vehicle has toppled over could be explained by the rider having set the two-wheeled vehicle upright in step 340 or, alternatively, by the identification that it has been turned by 180° for a maintenance situation. In the latter case, locking or deactivating the drive in step 360 would be useful for replacing the chain. If, however, it is identified in step 340 that the vehicle has not toppled over, the method can be terminated or enabled to detect new sensor variables for a re-evaluation in step 300.

In a further exemplary embodiment, before the classification or identification of the collision or the situation in which the vehicle has fallen over in step 330, a preceding step 320 can be carried out in which the threshold values used, e.g., $SW_K$, $SW_E$, $SW_x$, or $SW_y$, can be determined on the basis of operational variables of the two-wheeled vehicle and/or on the basis of riding parameters or environmental parameters, e.g., on the basis of the variance of the detected angular rate variable in the x and/or y direction. It is also possible for a plurality of threshold values to be determined for a sensor variable or an ascertained or generated value, for example in order to classify the severity of the collision. Optionally, at least one of the energy threshold values $E_{kin,x}$ or $E_{kin,y}$ can thus be configured to be variable. It is thus possible to have the corresponding energy threshold value increase or decrease with the tilt variable and/or the absolute roll or pitch angles. An energy threshold value for identifying a collision can thus be selected such that it is low at low values of the tilt variable, roll angle, and/or pitch angle and is likewise increased, e.g., exponentially or quadratically, as the tilt variable, roll angle, and/or pitch angle increase. If the detected or calculated energy exceeds the energy threshold value in the process, a collision is identified. Alternatively or additionally, an energy threshold value which identifies the vehicle impacting the ground can be used. In this case, at low values of the tilt variable, roll angle, and/or pitch angle, a high energy threshold value can initially be provided which drops, e.g., in an exponential or quadratic relationship, as the tilt variable, roll angle, and/or pitch angle increase. In the process, an impact can be identified when the energy threshold value is exceeded.

It is also possible to use probability models instead of threshold values or when deriving the threshold values. In this case, internal or external databases or individual detected sensor variables or the derived values can be used, for example.

It is thus possible for the analysis unit 100 to have corresponding databases available in the memory 110 or to be able to access a database of this kind using an in particular wireless connection.

In step 330, the identification or classification can also be carried out directly from the individually detected roll angle $\varphi$, pitch angle $\theta$, angular rate variables, in particular the variance thereof, and/or directional energy variables $E_{kin,x}$ or $E_{kin,y}$. Accordingly assigned threshold values can be provided for this purpose.

What is claimed is:

1. A method for classifying an accident event of a two-wheeled vehicle, comprising the following steps:
    detecting first and second sensor variables, which represent acceleration of the two-wheeled vehicle in two directions in a movement plane of the two-wheeled vehicle;
    generating a first integration variable based on a temporal integration of the first sensor variable;
    generating a second integration variable based on a temporal integration of the second sensor variable;
    performing a classification of the accident event based on the first and the second integration variables, and
    detecting a roll angle which represents a rotation of the two-wheeled vehicle about a longitudinal axis of the two-wheeled vehicle; and
    detecting a pitch angle which represents a rotation of the two-wheeled vehicle about a transverse axis of the two-wheeled vehicle,
    wherein the performing of the classification of the accident event additionally includes performing the classification based on the roll angle and pitch angle,
    generating an energy variable based on the first and the second integration variable;
    generating a tilt variable based on the roll angle and the pitch angle, wherein the performing of the classification of the accident event includes performing the classification based on the energy variable and tilt variable; and
    (i) generating an item of information that represents a collision of the two-wheeled vehicle when the energy variable exceeds an energy threshold value first and then the tilt variable exceeds a tilt threshold value, or (ii) generating an item of information that represents the two-wheeled vehicle having fallen over sideways when the energy variable does not exceed the energy threshold value and the tilt variable does not exceed the tilt threshold value.

2. The method as recited in claim 1, wherein the two-wheeled vehicle is a bicycle.

3. The method as recited in claim 1, wherein the performing of the classification includes:
    comparing the first integration variable and/or the second integration variable with at least one assigned threshold value, and/or
    comparing the first integration variable with the second integration variable.

4. The method as recited in claim 1, further comprising the following steps:
    detecting an acceleration variable which represents an acceleration of the two-wheeled vehicle in a longitudinal direction as the first sensor variable; and
    detecting an acceleration variable which represents an acceleration of the two-wheeled vehicle in a transverse direction to the longitudinal direction as the second sensor variable.

5. The method as recited in claim 4, wherein during the classification, an item of information is generated that represents a collision of the two-wheeled vehicle when:
    the first integration variable exceeds a first threshold value, and/or
    the first integration variable exceeds the second integration variable by a multiple.

6. The method as recited in claim 4, wherein during the classification, an item of information is generated that represents the two-wheeled vehicle having fallen over sideways, when:
    the second integration variable exceeds a second threshold value, and/or
    the second integration variable exceeds the first integration variable by a multiple.

7. The method as recited in claim 1, wherein the classification takes account of the fact that the roll angle and/or the pitch angle have exceeded a corresponding threshold value, and taking into account the threshold values being exceeded within a predetermined time interval.

8. The method as recited in claim 1, further comprising the following steps:
    detecting a first angular rate which represents a rotation of the two-wheeled vehicle about a longitudinal axis of the two-wheeled vehicle, and
    detecting a second angular rate which represents a rotation of the two-wheeled vehicle about a transverse axis of the two-wheeled vehicle, wherein the performing of the classification of the accident event includes performing the classification of the accident event based on the first and the second angular rates; and
    (i) generating an item of information that represents the two-wheeled vehicle having fallen over sideways when the first angular rate exceeds a first angular rate threshold value, or (ii) generating an item of information that represents a collision of the two-wheeled vehicle when the second angular rate exceeds a second angular rate threshold value.

9. A device for classifying an accident event of a two-wheeled vehicle, comprising:
    an analysis unit configured to:
        detect first and second sensor variables, which represent acceleration of the two-wheeled vehicle in two directions in a movement plane of the two-wheeled vehicle;
        generate a first integration variable based on a temporal integration of the first sensor variable;
        generate a second integration variable based on a temporal integration of the second sensor variable;
        perform a classification of the accident event based on the first and the second integration variables, including outputting an item of information which represents a collision of the two-wheeled vehicle or the two-wheeled vehicle having fallen over sideways, and detecting a roll angle which represents a rotation of the two-wheeled vehicle about a longitudinal axis of the two-wheeled vehicle; and detecting a pitch angle which represents a rotation of the two-wheeled vehicle about a transverse axis of the two-wheeled vehicle, wherein the performing of the classification of the accident event additionally includes performing the classification based on the roll angle and pitch angle, generating an energy variable based on the first and the second integration variable;

generating a tilt variable based on the roll angle and the pitch angle, wherein the performing of the classification of the accident event includes performing the classification based on the energy variable and tilt variable; and (i) generating an item of information that represents a collision of the two-wheeled vehicle when the energy variable exceeds an energy threshold value first and then the tilt variable exceeds a tilt threshold value, or (ii) generating an item of information that represents the two-wheeled vehicle having fallen over sideways when the energy variable does not exceed the energy threshold value and the tilt variable does not exceed the tilt threshold value.

10. The device as recited in claim 9, wherein the two-wheeled vehicle is a bicycle.

11. A two-wheeled vehicle, comprising a device for classifying an accident event of a two-wheeled vehicle, the device including:

an analysis unit configured to:
detect first and second sensor variables, which represent acceleration of the two-wheeled vehicle in two directions in a movement plane of the two-wheeled vehicle;

generate a first integration variable based on a temporal integration of the first sensor variable;

generate a second integration variable based on a temporal integration of the second sensor variable;

perform a classification of the accident event based on the first and the second integration variables, including outputting an item of information which represents a collision of the two-wheeled vehicle or the two-wheeled vehicle having fallen over sideways, and detecting a roll angle which represents a rotation of the two-wheeled vehicle about a longitudinal axis of the two-wheeled vehicle; and detecting a pitch angle which represents a rotation of the two-wheeled vehicle about a transverse axis of the two-wheeled vehicle, wherein the performing of the classification of the accident event additionally includes performing the classification based on the roll angle and pitch angle, generating an energy variable based on the first and the second integration variable;

generating a tilt variable based on the roll angle and the pitch angle, wherein the performing of the classification of the accident event includes performing the classification based on the energy variable and tilt variable; and (i) generating an item of information that represents a collision of the two-wheeled vehicle when the energy variable exceeds an energy threshold value first and then the tilt variable exceeds a tilt threshold value, or (ii) generating an item of information that represents the two-wheeled vehicle having fallen over sideways when the energy variable does not exceed the energy threshold value and the tilt variable does not exceed the tilt threshold value.

12. The two-wheeled vehicle as recited in claim 11, wherein the two-wheeled vehicle is a bicycle.

\* \* \* \* \*